United States Patent
Miroshnikov et al.

(10) Patent No.: US 10,171,494 B2
(45) Date of Patent: Jan. 1, 2019

(54) SCARECROW FOR DATA SECURITY

(71) Applicant: International Business Machines Corporation, Armonk, NY (US)

(72) Inventors: Roza Miroshnikov, Vaughan (CA); David Rozenblat, Nes Harim (IL); Oded Sofer, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 15/044,479

(22) Filed: Feb. 16, 2016

(65) Prior Publication Data
US 2017/0237771 A1    Aug. 17, 2017

(51) Int. Cl.
*H04L 29/06* (2006.01)

(52) U.S. Cl.
CPC ...... *H04L 63/1466* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 6,408,391 B1 | 6/2002 | Huff et al. | |
| 7,346,922 B2 | 3/2008 | Miliefsky | |
| 7,603,709 B2 | 10/2009 | Lewis et al. | |
| 7,681,234 B2 * | 3/2010 | Florencio | H04L 63/14 726/22 |
| 8,266,696 B2 * | 9/2012 | O'Rourke | H04L 63/0227 726/23 |
| 9,129,108 B2 | 9/2015 | Drissi et al. | |
| 2006/0195905 A1 * | 8/2006 | Fudge | G06F 11/008 726/25 |
| 2011/0321175 A1 | 12/2011 | Slater | |
| 2012/0023572 A1 * | 1/2012 | Williams, Jr. | G06F 21/552 726/13 |
| 2012/0255003 A1 | 10/2012 | Sallam | |
| 2012/0272314 A1 * | 10/2012 | Lyon | G06F 21/55 726/22 |
| 2013/0074187 A1 * | 3/2013 | Kim | G06F 21/56 726/24 |
| 2014/0181973 A1 * | 6/2014 | Lee | G06F 21/562 726/23 |
| 2015/0026813 A1 * | 1/2015 | Wang | H04L 63/1408 726/25 |

(Continued)

OTHER PUBLICATIONS

Bilar et al., "Using a novel behavioral stimuli-response framework to Defend against Adversarial Cyberspace Participants", 2011 3rd International Conference on Cyber Conflict (ICCC), Jun. 7-10, 2011, Tallinn, Estonia, pp. 1-16.

(Continued)

*Primary Examiner* — Trang T Doan
(74) *Attorney, Agent, or Firm* — Edward J. Wixted, III

(57) ABSTRACT

A method, computer program product and/or system receives information pertaining to network data traffic from and/or to a network accessible resource, analyzes the information to determine whether a user is engaged in potential hacking transaction(s) with respect to the resource. On condition that the user is determined to be engaged in potential hacking transaction(s), a "scarecrow" message designed for display to the user, is generated and sent to the user.

15 Claims, 4 Drawing Sheets

(56) References Cited

U.S. PATENT DOCUMENTS

2015/0047032 A1\* 2/2015 Hannis ............... H04L 63/1416
  726/23
2015/0350161 A1 12/2015 Hsu et al.
2017/0104783 A1\* 4/2017 Vanunu ............... H04L 63/1466

OTHER PUBLICATIONS

Edwards, Tim, "Re: rkhunter error report", Wed, Aug. 27, 2008, 2 pages, <https://lists.debian.org/debian-user/2008/08/msg02134.html>.

Stearns, Bill, "Warn if a packet sniffer is running", Cloud Passage Blog, Sep. 5, 2012, 5 pages.

Zarras, Apostolis, "The Art of False Alarms in the Game of Deception: Leveraging Fake Honeypots for Enhanced Security", 2014 International Carnahan Conference on Security Technology (ICCST), Oct. 13-16, 2014, pp. 1-6, Rome.

\* cited by examiner

SCARECROW FOR DATA SECURITY

BACKGROUND

The present invention relates generally to the field of computer security, and more particularly to deterrence of users who attempt to breach the security of computer systems.

Computer security (also known as cyber-security), is the protection of computer systems and the information stored on them. Relentless cyber-attacks come from individuals and organizations attempting to breach the security of computer systems and are often motivated by criminal intent, monetary gain, attacks against personal, business or national security interests, etc.

SUMMARY

According to an aspect of the present invention, there is a method, computer program product and/or system that performs the following operations (not necessarily in the following order): (i) receiving information pertaining to network data traffic being communicated from and/or to a user's computer which is operated by a user; (ii) analyzing the information to determine whether the user is engaged in potential hacking transaction with respect to a network accessible resource; and/or (iii) on condition that the user is determined to be engaged in potential hacking conduct, generating a scarecrow message designed for display in human understandable form and format to the user on a computer operated by the user, and sending the scarecrow message to the user's computer. Potential hacking transaction(s) are defined as any set of communication(s) to and/or from the user's computer that tend to indicate that the user's computer is engaged in subverting computer security for malicious purposes.

DETAILED DESCRIPTION

Figure 1:
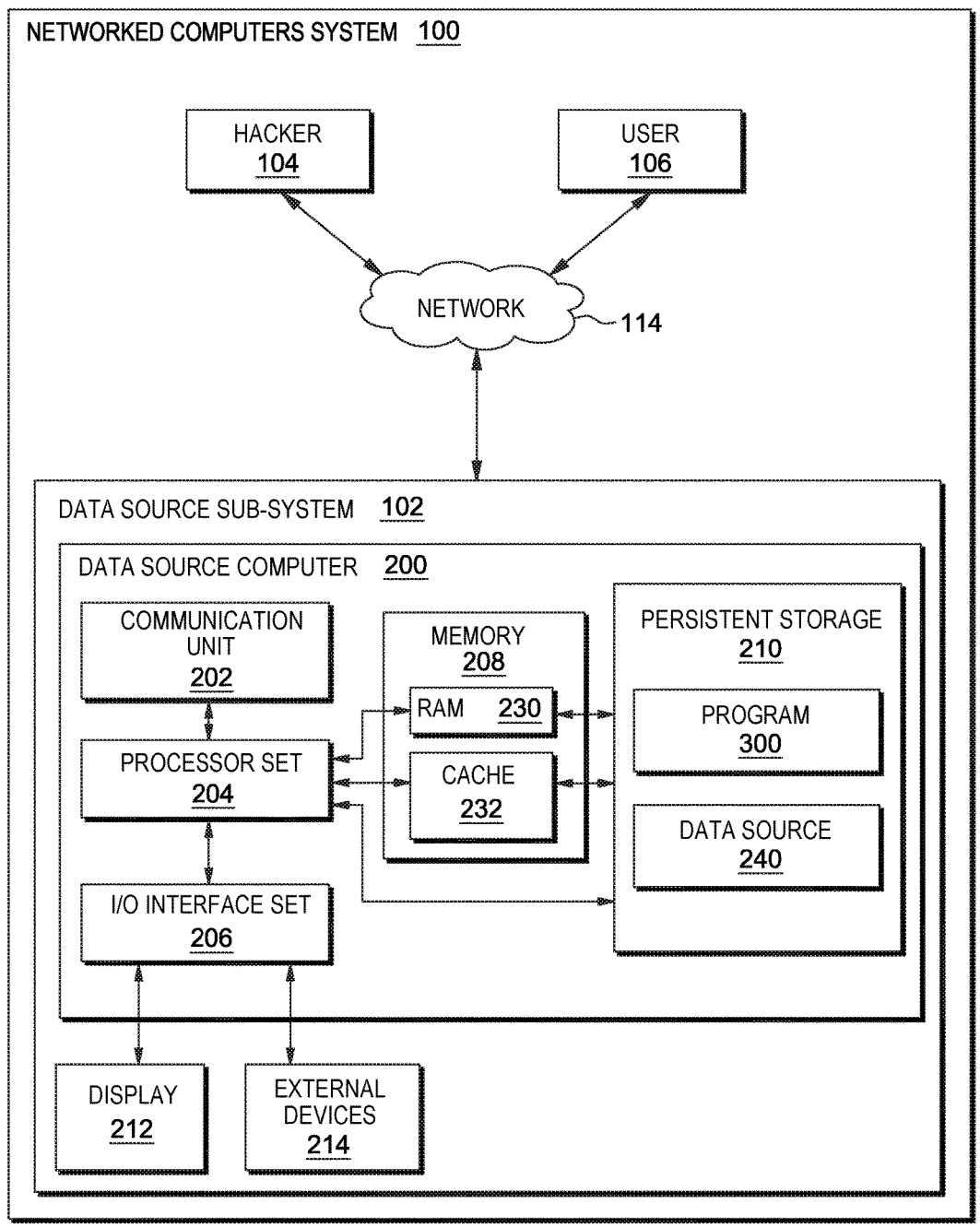
FIG. 1 is a block diagram of a first embodiment of a system according to the present invention.

Embodiments of the present invention provide a mechanism designed to deter or ward off a cyber-attacker (also referred to as a hacker). The computer system gathers information relative to a cyber-attack and sends a message (also herein referred to as a "scarecrow") to the hacker. The message alerts the hacker that: (i) his or her activities have been detected; (ii) the hacker's connection profile is being recorded; and/or (iii) all available information relative to the hacker's activities are being recorded. The message is intended to deter the hacker from further activities regarding the cyber-attack (in other words, to scare off the hacker, hence the term "scarecrow").

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: data source sub-system 102; hacker 104; user 106; communication network 114; data source computer 200; communication unit 202; processor set 204; input/output (I/O) interface set 206; memory device 208; persistent storage device 210; display device 212; external device set 214; random access memory (RAM) devices 230; cache memory device 232; data source 240; and program 300.

Data source sub-system 102 is, in many respects, representative of the various computer sub-system(s) in the present invention. Accordingly, several portions of data source sub-system 102 will now be discussed in the following paragraphs.

Data source sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Data source sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Data source sub-system 102 is shown as a block diagram with many double arrows. These double arrows (no separate reference numerals) represent a communications fabric, which provides communications between various components of data source sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for data source sub-system 102; and/or (ii) devices external to data source sub-system 102 may be able to provide memory for data source sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to data source sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with data source computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
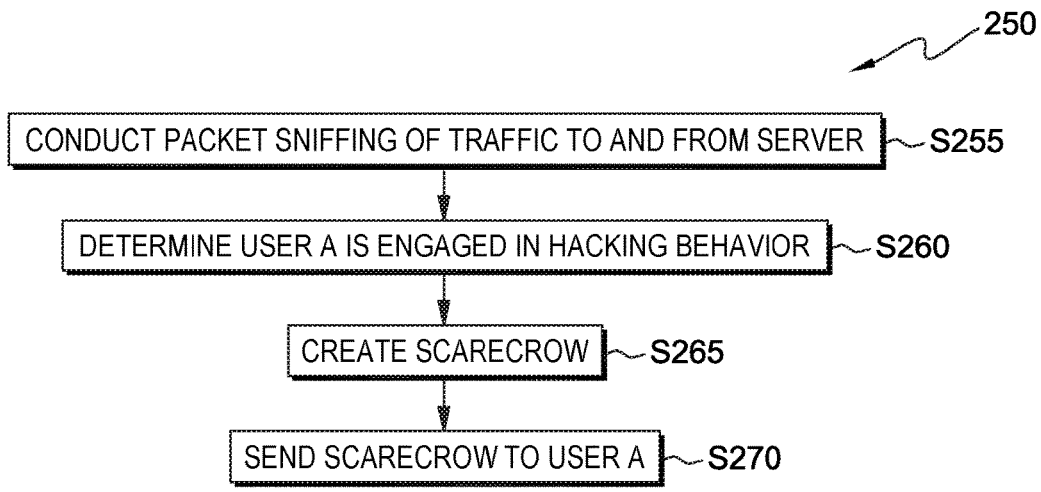
FIG. 2 is a flowchart showing a first embodiment method performed, at least in part, by the first embodiment system.
Figure 3:
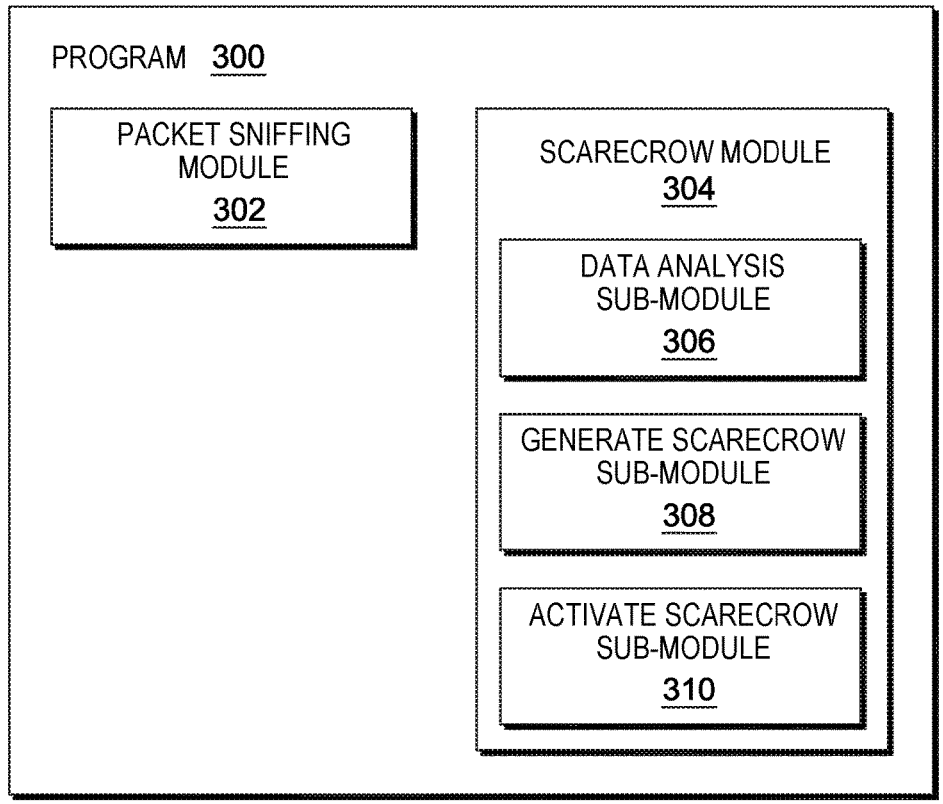
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where packet sniffing module 302 of program 300, conducts routine packet sniffing of traffic inbound to, and outbound from data source computer 200, of data source sub-system 102 (as shown in FIG. 1), to generate data for analysis, (not shown in the figures). The data includes: (i) the content of data files; (ii) the methods users, such as hacker 104 (see FIG. 1) employ to access the data files; and (iii) metadata of the files that are flowing (file types, file names, file destinations and/or sources, etc.).

Processing proceeds at operation S260, where data analysis sub-module 306, of scarecrow module 304, of program 300, analyzes the data generated by packet sniffing module 302. The data analysis sub-module determines that hacker 104 (see FIG. 1) is engaged in activities consistent with hacking (also known as a cyber-attack) against data source computer 200 (see FIG. 1). The data analysis sub-module generates alert results (not shown) for use at operation S265 (see below).

Alternatively, in some embodiments, user 106 is selected at random to receive a scarecrow, to remind users that their actions with regard to data source 200 are monitored and recorded. In some embodiments, the random selection is further refined to select from various classes of user, for example external users only, internal users only, or users having root access, newly added users, long-term users, etc. In these embodiments, users are selected at random for the purpose of warning off a hacker whose hacking methods elude detection by data analysis sub-module 306.

Processing proceeds at operation S265, where generate scarecrow sub-module 308, of scarecrow module 304, of program 300, generates a scarecrow (not shown) based on the alert results (not shown) generated at operation S260 (see above).

Processing proceeds at operation S270, where activate scarecrow sub-module 310, of scarecrow module 304, of program 300, sends the scarecrow (not separately shown) to hacker 104 (see FIG. 1).

Alternatively, in some embodiments, activate scarecrow sub-module 310 initiates follow-on operations such as: (i) causing termination of any active session(s) between hacker 104 and data source computer 200; (ii) informing a data source computer administrator of hacker 104's suspect activities; (iii) informing hacker 104's manager, or apparent manager in the case of spoofing or the like, of the user's suspect activities with respect to an enterprise computing system; and/or (iv) revoking all access privileges of hacker 104 with respect to the data source computer.

In some embodiments of the present invention, scarecrow module 304, of program 300 detects activities of more than one user who are operating in concert with each other in perpetrating a cyber-attack. In response, the scarecrow module sends scarecrows to each of the user clients involved in the attack. Alternatively, or in addition, in some embodiments, the scarecrow module triggers further responses by conventional security products protecting the data source computer such as blocking access to data source computer 200 by all users identified as participating in the cyber-attack.

Figure 4:
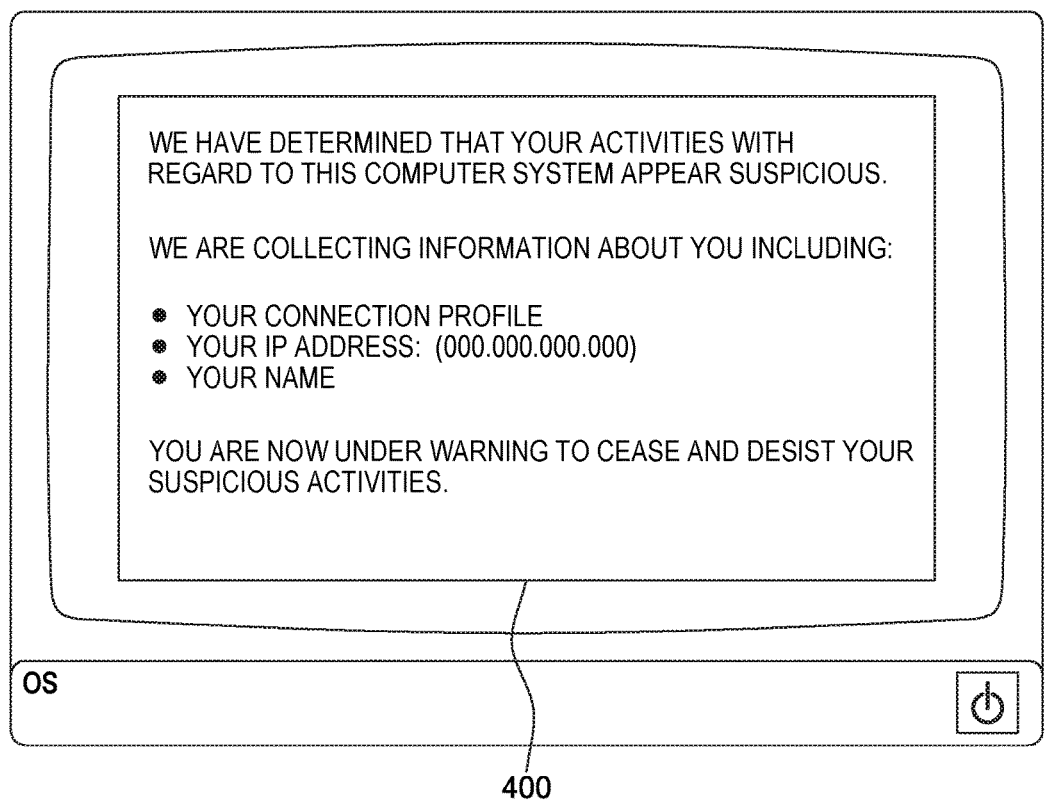
FIG. 4 is a screenshot showing information that is generated by some embodiments of the present invention.

Screenshot 400 of FIG. 4 shows an example scarecrow as generated in some embodiments of the present invention.

Figure 5:
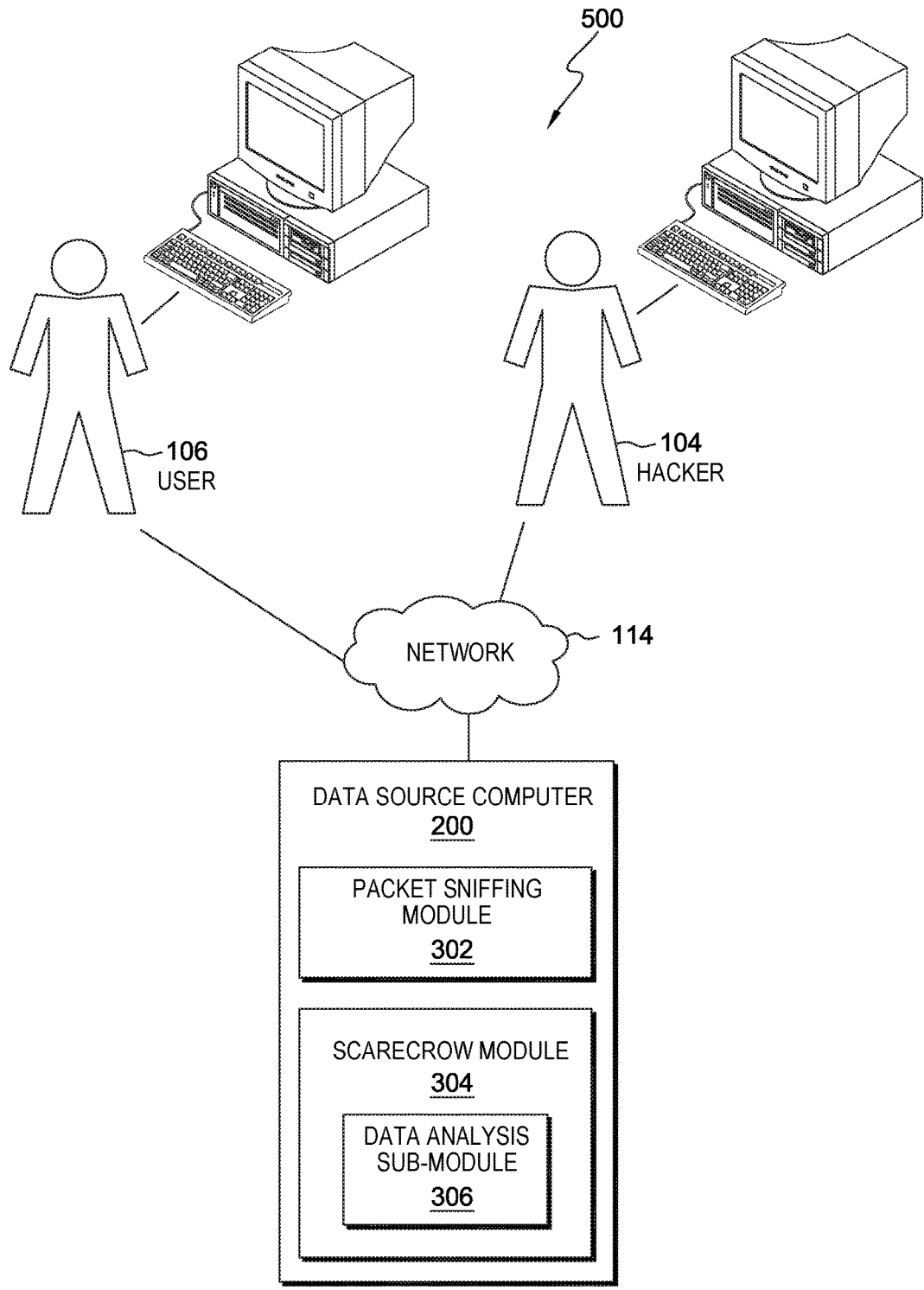
FIG. 5 is a block diagram showing an environment in which a second embodiment system operates.

FIG. 5 shows computing environment 500 in which some embodiments of the present invention operate, including: hacker 104; user 106; network 114; data source computer 200; data source 240 (as shown on FIG. 1); packet sniffing module 302; scarecrow module 304; and data analysis sub-module 306.

In the embodiment of FIG. 5, packet sniffing module 302, resides in data source computer 200, and conducts routine packet sniffing of network traffic to and from data source computer 200. Data analysis sub-module 306, of scarecrow module 304 analyzes the data generated by packet sniffing module 302. The data analysis sub-module determines that hacker 104 is engaged in activities consistent with hacking (also known as a cyber-attack) against data source computer 200. The data analysis sub-module generates alert results (not shown). Scarecrow module 304, generates a scarecrow based on the alert results. Scarecrow module 304, sends the scarecrow (not separately shown) to hacker 104.

III. Further Comments and/or Embodiments

Some embodiments of the present invention may recognize one, or more, of the following facts, potential problems and/or potential areas for improvement with respect to the current state of the art: (i) some conventional cyber security products work in defense mode only, which affords to a hacker (also sometimes referred to as an attacker) the opportunity to continue with a cyber-attack indefinitely; (ii) some conventional cyber security products provide no element of surprise designed to deter or ward off a hacker; (iii) some conventional cyber security products provide no "strike-back" capability, also known as "proactive-defense" and "active protection;" (iv) many conventional cyber-security products work in defense mode yet have no element to deter or strike back at a cyber-attacker; and/or (v) under currently conventional defense-oriented protection technologies, a cyber-attacker has a relatively long time to try to use tools to press a cyber-attack in hopes of finding success.

Some embodiments of the present invention may include one, or more, of the following features, characteristics and/or advantages: (i) creates a "scarecrow" upon a user's session creation for the sake of data protection; (ii) shows the user that the system is protected and watches every step the user makes; (iii) displays a pop-up (or other) type of message (sometimes called a "breaking message") to the user, indicating that the system is protected, and is watching, gathering and recording information relative to the user's activities; (iv) creates a process that can be implemented on any data source; (v) includes a portable kernel code implementable on various operating systems; (vi) listens to the data access, using one or more internet protocols such as internet content adaptation protocol (icap); and/or (vii) when a set of conditions are met, displays a message to the user (a potential hacker, also called a user engaged in potential hacking conduct) that the system is protected, that it watches every move made by the hacker, and can identify the hacker's connection profile.

Some embodiments of the present invention may further include one, or more, of the following features, characteristics and/or advantages: (i) includes kernel code for some conventional operating systems that can be installed on any data source, to listen to predefined, or user-defined ports; (ii) includes a content adaptation protocol (cap) listener that identifies the packet header; (iii) includes an ability to set rules, conditions and/or characteristics related to a packet, for triggering a responsive action such as sending a message to the user (potential attacker); and/or (iv) includes a hook to call program methods that captures data relative to a potential attacker, and the attacker's connection profile, the data provided as an input for custom options.

Further with respect to item (iii) in the paragraph above, actions to be taken when the conditions are met include sending a predefined notification message (also referred to as a scarecrow) to the potential attacker, the scarecrow stating, for example, that the system is protected, every move is tracked and the system is identifying (or has identified) the attacker's connection characteristics.

Some embodiments of the present invention may include one, or more, of the following features, characteristics and/or advantages: (i) focuses on data security and protection; (ii) creates dynamic (self-adaptive) "scarecrows" to prevent (or deter) an attack and its precursor steps; (iii) does not require prior knowledge of an attack or its precursor operations; (iv) focuses on attack prevention or deterrence; (v) dynamically creates "scarecrows"; (vi) dynamically prevents attack; (vii) is a data-driven, rule-based system to dynamically prevent an attack; (viii) creates dynamic scarecrows to prevent data security breaches; (ix) includes a component that resides on a data source (for example, a database (db) server, a file server or any document repository); (x) captures all access information regarding accesses to the data source; (xi) buffers the access information; and/or (xii) creates and activates a scarecrow when triggered to do so.

In some embodiments of the present invention, generation of a scarecrow is triggered based on: (i) time (for example, at predetermined time intervals, regardless of the context); (ii) the machine that is accessed; (iii) information related to the requester; (iv) specific information that is requested; (v) the status of an information request; (vi) content of the response to the information request (for example, some embodiments run a "regular expression" that looks for example, for social security numbers, or driver's license numbers, etc., in the response); and/or (vii) "random" criteria or events. Other embodiments correlate multiple information requests to determine whether to trigger a scarecrow (for example, N requests by the same client in M seconds, where N and M are predefined values).

In some embodiments, the scarecrow is a generic warning message displayed or otherwise conveyed to a user. The scarecrow can be displayed on a graphical user interface (for example in a popup window, banner, etc.). Alternatively, the scarecrow can be displayed in a command-line type user interface. In some embodiments, the scarecrow is a customized warning message including details specific to the user session such as the user's internet protocol (IP) address, and the connection profile.

In some embodiments, scarecrow module 304 takes actions other than displaying a generic or customized warning message. In one embodiment, the scarecrow includes a faked (phantom) background process that is noticeable by a user and intended to lead a hacker into believing that his or her suspect activities have been detected. Examples of faked background processes that are noticeable by a user include: (i) a shell-script on a machine, the script given a name such as "Smart-User-Tracker" that is visible when the user looks for active processes (the processes are not accessible to the user); (ii) a hook on the operating system (OS) login that notifies the user that everything is being recorded; and/or (iii) a hook on a database (DB) login that informs the user that the every step is being recorded (for example, if the user logs in to an OS as UserA and then logs in to a DB as UserB, the message includes the user's log-in chain).

In some embodiments of the present invention, activation of a scarecrow involves manipulating the response (that is, altering the data to generate altered data) of a protected resource server (sometimes referred to as a network accessible resource) by, for example: (i) removing protected content from the response; (ii) blocking the response altogether; (iii) adding a watermark to the response; (iv) adding notations to the response; (v) notifying system administration; and (vi) alerting a conventional security system to the suspected hacker's activities.

Some embodiments of the present invention make use of the information gathered relative to a hacker to enable the scarecrow to push context based information to the hacker, strengthening the deterrent value of the scarecrow. This information includes: (i) information with respect to who is accessing the data (client IP address, client host, direct user, indirect user); (ii) what method(s) are used to access the data (what command(s) and application(s) are used); (iii) the time of access; and/or (iv) information about the accessed data such as the database table, field, view, synonym, procedure, object, file, directory, host and IP address (of the client requesting access to the data), access status (succeeded, failed, exception type).

In some embodiments of the present invention, the access information is stored in a buffer that can be moved to more permanent storage (such as a disk) at a later stage for persistency. The data can be accumulated and correlated and cross-checked across multiple sessions. The information is buffered in FIFO mode with a limit of size.

In some embodiments of the present invention, examples of generic rules that may be used in determining that a scarecrow is needed and/or when creating a scarecrow include: (i) the requested information contains special-characters and the time accessed is within specific time window and the same client is accessing another target in parallel; (ii) the client accessing the data is from an external network segment, the request occurs on a weekend and the data accessed fits specific credit-card number formatting; (iii) randomly, when access to a specific database is requested; (iv) the data accessed is consistent with a specific format (such as a social security number) and the number of accesses exceeds a pre-defined number within a pre-defined time interval (that is, the rate of requests exceeds a pre-defined threshold); (v) the client information is in a pre-defined list and data access attempts generated a pre-defined number of errors within a pre-defined time interval (that is, the rate of errors occurring exceeds a pre-defined threshold); (vi) the requesting application is of a specific type and the target source is in a pre-defined list; (vii) the volume of data accessed is greater than a pre-defined threshold and the data contains numbers having a format that is consistent with telephone numbers and the requesting user name matches a pre-determined format; (viii) the data accessed is of a pre-determined type and the requesting user name is in a pre-defined list and the command used to access the data belongs to a pre-defined group; (ix) the request generates a pre-defined error and the access request occurs during a weekend and the client IP address is external to a demilitarized zone (DMZ, see definition at the end of sub-section III); (x) the client hostname (also referred to as a computer hostname) exists in more than a pre-defined number of sessions or is attempting to access more than a pre-defined number of targets within a pre-defined time interval, (xi) the user accesses purchase order information during a weekend (or other predefined time window), and retrieves more than one record within an hour; (xii) the user accesses more than 20 records from a "contacts" table; (xiii) a user accesses a system or database via more than one client hostname within five minutes; (xiv) a user accesses operational data directly via a DB and runs a data definition language (DDL) or a data manipulation language (DML) command; (xv) alteration of a specific stored procedure that is not part of a FixPack installation; (xvi) when a system or database is accessed by a new user; and/or (xvii) upon manual activation (sometimes referred to "break-a-glass," a metaphorical reference to raising an alarm upon discovery of an emergency situation).

Some embodiments of the present invention use, for example, a hook or regular expression to detect predefined patterns and dynamically generate a user-defined scarecrow based on data access information. Examples of data access information include: (i) credit card numbers; (ii) social security numbers; (iii) personal contact information; (iv) telephone numbers; (v) international statistical classification of diseases (ICD) numbers; and (vi) health record identification numbers, etc. The process further tracks the connection profile, which includes: the client hostname, the internet protocol (IP) address, network segment, and/or application program, etc. The scarecrow is displayable by software running in the user's computer. The scarecrow is in human understandable form and format, and informs a user that the system is tracking the user's activities. The scarecrow is configured to display specific information to indicate that the system has a wide perspective. In some embodiments, the scarecrow shows that it knows about multiple sessions the user has and/or previously had, multiple targets or correlated information (access chain as an example). Further, it informs the user that it adds a watermark (a type of signature added to the data or metadata) to enable efficient tracking of the requested data and path (the path referring to movement of the data, both during the initial access and subsequently thereafter). The scarecrow tells the user that everything is audited and is processed for security reasons and it provides evidence in support of this claim.

Some embodiments of the present invention may include one, or more, of the following features, characteristics and/or advantages: (i) can operate in any computing platform including in a cloud context, provided that it can access the information needed; (ii) collects and analyzes access information; (iii) generates a scarecrow dynamically; (iv) generates a scarecrow based on generic rules and/or data information; (v) generates a generic scarecrow; (vi) generates a scarecrow related to metadata in the sniffed information; and/or (vii) generates a scarecrow related to a user's access information.

In some embodiments of the present invention, scarecrows are automatically and dynamically created by various methods, based on information collected. A user (a potential attacker) is the target audience of a scarecrow. A scarecrow is intended to scare the user by presenting information (for example, a noticeable alert, such as a pop-up window) to indicate that the system is aware of, and tracking, the user's activities with respect to the computer system.

Some embodiments of the present invention, are implemented as a component on a server (for example, a database server and/or a file server, etc.), and apply to all users of all types (for example, normal users, system administrators, supervisors, users with root-level access, etc.).

Some embodiments determine when to generate a scarecrow and the content of the scarecrow, based on information associated with the user's access to a server and rule(s) defined for the access.

In response to an attack coordinated among many users, some embodiments of the present invention correlate access of the various users to generate scarecrow(s) when and where hacking activity is determined to exist.

In some embodiments of the present invention, guidelines (rules) for scarecrow generation are used to determine: (i) when to generate a scarecrow; (ii) the type of scarecrow to be generated; (iii) the content of the scarecrow; and/or (iv) to which user(s) a scarecrow is distributed.

Some embodiments of the present invention make use of information associated with a user's access to a server. This information includes: (i) the application used to access the data; (ii) the specific command(s) used to access the data; (iii) the time window (off hours, holiday, work-hours, etc.) when the data is accessed; and/or (iv) frequency of access.

An example scenario will now be presented to illustrate an embodiment of the present invention. A first user conducts legitimate transactions with a server. A second user is a hacker, listening in on the traffic between the first user and the server by sniffing data packets in the traffic. The scarecrow system detects that the second user is sniffing data packets in the traffic. The scarecrow system generates a scarecrow and sends it to the second user. The second user, seeing the information presented by the scarecrow, decides attacking the server is not worth the risk of being caught, and halts any further hacking activities directed at the server. Alternatively, the scarecrow system, in response to identifying the second user as a hacker, alerts other (conventional) security products to the cyber-attack in progress. The conventional security products respond to defend against the cyber-attack, while the scarecrow is intended to deter the user against continuing with the attack.

Some embodiments of the present invention may include one, or more, of the following features, characteristics and/or advantages: (i) provides a data protection scarecrow; (ii) provides a data protection scarer; (iii) provides a scarecrow for security; (iv) generates a dynamic scarecrow based on sniffed information; (v) produces a self-adaptive scarecrow for data protection; (vi) pushes information to a user when relevant; (vii) is based on a publish-subscribe design pattern; (viii) is rule-based; and/or (ix) provides a data guard scarecrow. Further to item (vii) above, a publish-subscribe design pattern is used for the sake of performance and high volume. The packet sniffer "publishes" information that is captured and the scarecrow "subscribes" to these publications and takes actions when indicated.

IV. Definitions

DMZ, demilitarized zone (sometimes referred to as a perimeter network): a physical or logical sub-network that contains and exposes an organization's external-facing services to a larger and/or untrusted network (for example, the Internet).

Publish-subscribe design pattern: a messaging protocol wherein message senders (publishers), characterize published messages into classes without knowledge of potential subscribers. Subscribers express interest in their chosen message classes and receive only messages of the chosen classes.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

receiving information pertaining to network data traffic being communicated between a protected resource that is network accessible and a plurality of computers, including a first computer that is at least partially under the control of a user;

determining, by machine logic performed by a machine, and based at least in part on a set of detection rules, and the information, that the plurality of computers are acting in concert to perform a hacking transaction with respect to the protected resource; and in response to determining that the plurality of computers are acting in concert to perform the hacking transaction:

generating, by machine logic performed by a machine, a plurality of scarecrow messages, respectively corresponding to the plurality of computers, designed for display in human understandable form and format, sending the plurality of scarecrow messages, through a network communication channel, to respectively corresponding computers of the plurality of computers, and sending, by machine logic performed by a machine, a security alert to a security product;

wherein:

the set of detection rules enables detection of at least one indicator of a hacking transaction where the indicator of the hacking transaction is any set of communication(s) from the first computer that tend to indicate that the first computer is engaged in subverting security of the protected resource; and each respective scarecrow message is a customized warning message, the content of which comprises an element that is selected from the group consisting of:

an internet protocol (IP) address associated with the respectively corresponding computer; a phantom background process; and a log-in chain associated with the respectively corresponding computer.

2. The computer-implemented method of claim 1 wherein an indicator of a hacking transaction is based on information associated with the user's access to the protected resource and a set of access rules defined for access to the protected resource, and the indicator is selected from the group consisting of: (i) an indication that the user has previously engaged in a hacking transaction; (ii) the protected resource receives a plurality of requests from the user's computer at a rate that exceeds a pre-determined threshold; (iii) data access attempts received by the protected resource, and from the first computer, generate errors at a rate exceeding a pre-defined threshold; and (iv) a hostname associated with the first computer exists in more than a pre-defined threshold number of sessions with the protected resource.

3. The computer-implemented method of claim 1 further comprising:
determining that the first computer is attempting to access data from the protected resource;
in response to determining that the first computer is attempting to access data from the protected resource:
receiving, from the protected resource, the data, altering the data to generate altered data, and
sending, through a network communication channel, the altered data to the first computer.

4. The computer-implemented method of claim 1 wherein:
the scarecrow message is sent to the first computer in a form and format that is displayable by software running on the first computer.

5. The computer-implemented method of claim 3 wherein altering the data includes an action selected from the group consisting of: (i) adding an electronic watermark to the data; (ii) preventing transmission to the first computer of at least a portion of the data; and (iii) substituting transformed data in place of at least a portion of the data.

6. A computer program product comprising a computer readable storage medium having stored thereon:
first program instructions programmed to receive information pertaining to network data traffic being communicated between a protected resource that is network accessible and a plurality of computers, including a first computer that is at least partially under the control of a user;
second program instructions programmed to determine, by machine logic performed by a machine, and based at least in part on a set of detection rules, and the information, that the plurality of computers are acting in concert to perform a hacking transaction with respect to the protected resource; and
in response to determining that the plurality of computers are acting in concert to perform the hacking transaction:
third program instructions programmed to generate a plurality of scarecrow messages, respectively corresponding to the plurality of computers, designed for display in human understandable form and format,
fourth program instructions programmed to send the plurality of scarecrow messages, through a network communication channel, to the respectively corresponding computers of the plurality of computers, and
fifth program instructions programmed to send a security alert to a security product;

wherein:
the set of detection rules enables detection of at least one indicator of a hacking transaction where the indicator of the hacking transaction is as any set of communication(s) from the first computer that tend to indicate that the first computer is engaged in subverting security of the protected resource; and
each respective scarecrow message is a customized warning message, the content of which comprises an element that is selected from the group consisting of: an internet protocol (IP) address associated with the respectively corresponding computer; a phantom background process; and a log-in chain associated with the respectively corresponding computer.

7. The computer program product of claim 6 wherein an indicator of a hacking transaction is based on information associated with the user's access to the protected resource and a set of access rules defined for access to the protected resource, and the indicator is selected from the group consisting of: (i) an indication that the user has previously engaged in a hacking transaction; (ii) the protected resource receives a plurality of requests from the user's computer at a rate that exceeds a pre-determined threshold; (iii) data access attempts received by the protected resource, and from the user's computer, generate errors at a rate exceeding a pre-defined threshold; and (iv) a hostname associated with the user's computer exists in more than a pre-defined threshold number of sessions with the protected resource.

8. The computer program product of claim 6 further comprising:
sixth program instructions programmed to determine that the first computer is attempting to access data from the protected resource;
in response to determining that the first computer is attempting to access data from the protected resource:
seventh program instructions programmed to receive, from the protected resource, the data,
eighth program instructions programmed to alter the data to generate altered data, and
ninth program instructions programmed to send, through a network communication channel, the altered data to the first computer.

9. The computer program product of claim 6 wherein the scarecrow message is sent to the first computer in a form and format that is displayable by software running on the first computer.

10. The computer program product of claim 8 wherein altering the data includes an action selected from the group consisting of: (i) ninth program instructions programmed to add an electronic watermark to the data; (ii) tenth program instructions programmed to prevent transmission to the first computer of at least a portion of the data; and (iii) eleventh program instructions programmed to substitute transformed data in place of at least a portion of the data.

11. A computer system comprising:
a processor(s) set; and
a computer readable storage medium;
wherein:
the processor(s) set is structured, located, connected and/or programmed to run program instructions stored on the computer readable storage medium; and
the program instructions include:
first program instructions programmed to receive information pertaining to network data traffic being communicated between a protected resource that is network accessible and a plurality of computers, including a first computer that is at least partially under the control of a user;

second program instructions programmed to determine, by machine logic performed by a machine, and based at least in part on a set of detection rules, and the information, that the plurality of computers are acting in concert to perform a hacking transaction with respect to the protected resource; and in response to determining that the plurality of computers are acting in concert to perform the hacking transaction:

third program instructions programmed to generate a plurality of scarecrow messages, respectively corresponding to the plurality of computers, designed for display in human understandable form and format, fourth program instructions programmed to send the plurality of scarecrow messages, through a network communication channel, to the respectively corresponding computers of the plurality of computers, and fifth program instructions programmed to send a security alert to a security product;

wherein:

the set of detection rules enables detection of at least one indicator of a hacking transaction where the indicator of the hacking transaction is as any set of communication(s) from the first computer that tend to indicate that the first computer is engaged in subverting security of the protected resource; and each respective scarecrow message is a customized warning message, the content of which comprises an element that is selected from the group consisting of: an internet protocol (IP) address associated with the respectively corresponding computer; a phantom background process; and a log-in chain associated with the respectively corresponding computer.

12. The computer system of claim 11 wherein an indicator of a hacking transaction is based on information associated with the user's access to the protected resource and a set of access rules defined for access to the protected resource, and the indicator is selected from the group consisting of: (i) an indication that the user has previously engaged in a hacking transaction; (ii) the protected resource receives a plurality of requests from the user's computer at a rate that exceeds a pre-determined threshold; (iii) data access attempts received by the protected resource, and from the user's computer, generate errors at a rate exceeding a pre-defined threshold; and (iv) a hostname associated with the user's computer exists in more than a pre-defined threshold number of sessions with the protected resource.

13. The computer system of claim 11 further comprising:

sixth program instructions programmed to determine that the first computer is attempting to access data from the protected resource;

in response to determining that the first computer is attempting to access data from the protected resource:

seventh program instructions programmed to receive, from the protected resource, the data, eighth program instructions programmed to alter the data to generate altered data, and ninth program instructions programmed to send, through a network communication channel, the altered data to the first computer.

14. The computer system of claim 11 wherein the scarecrow message is sent to the first computer in a form and format that is displayable by software running on the first computer.

15. The computer system of claim 13 wherein altering the data includes an action selected from the group consisting of: (i) ninth program instructions programmed to add an electronic watermark to the data; (ii) tenth program instructions programmed to prevent transmission to the first computer of at least a portion of the data; and (iii) eleventh program instructions programmed to substitute transformed data in place of at least a portion of the data.

\* \* \* \* \*